United States Patent [19]
Kubomura et al.

[11] Patent Number: 5,702,993
[45] Date of Patent: Dec. 30, 1997

[54] TRIAXIAL FABRIC COMPOSED OF CARBON FIBER STRANDS AND METHOD FOR PRODUCTION THEREOF

[75] Inventors: Kenji Kubomura; Hiromi Kimura; Hirotaka Shibata, all of Kawasaki, Japan

[73] Assignees: Nippon Steel Corporation, Tokyo; Sakase Adteck Co., Sakai-gun, both of Japan

[21] Appl. No.: 669,498
[22] PCT Filed: Nov. 2, 1995
[86] PCT No.: PCT/JP95/02248
  § 371 Date: Jul. 3, 1996
  § 102(e) Date: Jul. 3, 1996
[87] PCT Pub. No.: WO96/14455
  PCT Pub. Date: May 17, 1996

[30] Foreign Application Priority Data
  Nov. 4, 1994 [JP] Japan .................. 6-271622
[51] Int. Cl.$^6$ .................................................. B32B 7/00
[52] U.S. Cl. ................ 442/204; 428/408; 428/902; 139/426 R
[58] Field of Search .................... 428/408, 902; 442/204; 139/426 R

[56] References Cited

FOREIGN PATENT DOCUMENTS

| 49-008423 | 2/1974 | Japan . |
|---|---|---|
| 2-038481 | 3/1990 | Japan . |
| 3-113039 | 5/1991 | Japan . |

*Primary Examiner*—James J. Bell
*Attorney, Agent, or Firm*—Cushman, Darby & Cushman IP Group of Pillsbury Madison & Sutro LLP

[57] ABSTRACT

A triaxial fabric composed of carbon fiber strands is provided, which has a crimp releasing ratio $(L'-L)/L$ satisfying $[(L_o-L)/L_o] \times 0.7 \geq (L'-L)/L \geq 0$. Since the crimps of the fiber strands composing the fabric are preliminarily fixed, fiber breakage due to abrasion in the intersecting portions of the fabric is prevented, whereby a high quality triaxial fabric is obtained. A method for the production of such a fabric is also provided.

8 Claims, 3 Drawing Sheets

TRIAXIAL FABRIC COMPOSED OF CARBON FIBER STRANDS AND METHOD FOR PRODUCTION THEREOF

This application claims benefit of international application PCT/JP95/02248, filed Nov. 2, 1995, published as WO96/14455 May 15, 1996.

1. Technical Field

The present invention relates to a triaxial fabric composed of carbon fiber strands suitable for various members used in the space industry, such as those of an artificial satellite, which requires reduced weight and a high specific modulus.

2. Background Art

Carbon fiber-reinforced plastics have been widely used in various fields including the sport/leisure industry, the general industry and the aerospace industry, because they are light in weight and excellent in specific strength and specific modulus. Recently, the application of such materials to the aerospace industry, particularly to various members of artificial satellites, has been highlighted due to their characteristics.

Carbon fibers used as reinforcement are classified as PAN-based or pitch-based carbon fibers in accordance with the starting materials thereof. The pitch-based carbon fibers are more suitable for the space industry than the PAN-based carbon fibers because a graphite crystal structure easily grows in the fiber, to result in a high elastic modulus, high thermal conductivity and low thermal expansion coefficient, which are favorable in the space industry. A reinforcement substrate used for a composite may have various configurations such as unidirectional fibers, two dimensional fabrics or three dimensional fabrics in accordance with the use of the resultant composites. An ordinary fabric wherein two sets of fiber strands are interwoven with each other at a right angle (generally referred to as a "biaxial fabric") is usually used for a carbon fiber reinforced plastic material. Because this fabric exhibits a strong anisotropic property, it is necessary, when used in a portion wherein an isotropic property is required, to ply a plurality of such fabrics while varying orientation angles so that a so-called cross ply structure is obtained. Accordingly, there is a tendency for increased weight and for generating delamination between plies.

On the other hand, a triaxial fabric shown in FIGS. 1 and 2 has a structure wherein two sets of warp yarns (bias yarns) 2 are interwoven with one set of weft yarns (0° directional yarns) 1 at ±60° relative to a widthwise direction of the fabric. This fabric is inherently quasi-isotropic even as a single ply and thus needs no laying up, which results in the weight reduction and the prevention of delamination. It is also easy to further reduce the thickness of the single fabric. In addition, this fabric has advantages in that the shape-retaining ability is excellent due to its high shearing rigidity, and the strength per unit weight and the compression strength after damage by impact are high, and further it has a good aesthetic appearance.

The triaxial fabric, however, has a larger crimp (wave configuration of fiber strand) then the ordinary fabric, which means that fiber strands in the triaxial fabric are forcibly bent. Accordingly, in the triaxial fabric of carbon fiber strands, the fiber strands are abrasive in the intersection thereof and liable to be damaged to cause fiber breakages as shown in FIG. 3. The fabric having fiber breakages is not only unfavorable from the viewpoint of surface quality, but also has a risk of fabric breakage when the fabric is stretched even under a relatively low load. It is surmised that such fiber breakages are caused by the following mechanisms; one is that a large recovery force generates in the carbon fiber strand when the same is bent because of its high elastic modulus, which causes a large abrasive force between the intersecting portion of the fiber strands; and other is that, since the elongation at break of carbon fiber is small, the fiber is easily broken under the abrasion. Therefore, when carbon fibers having a high elastic modulus and a smaller elongation at break are used, the generation of fiber breakage will be further accelerated.

Accordingly, a triaxial fabric having less fiber breakages and excellent in surface quality has been required. Although such a demand is particularly aimed at a fabric composed of high elastic modulus carbon fibers, to manufacture the triaxial fabric made from the high elastic modulus carbon fibers is difficult because fiber breakage is liable to occur during the manufacturing process. At present, it is said that carbon fibers capable of forming a triaxial fabric in an industrial sense are solely those having an elastic modulus of 40 tf/mm$^2$ or less (see Science & Industry, vol. 66, page 273, published in 1992). The weaving operation becomes more difficult if fiber strands having a smaller linear density are used for the purpose of weight reduction, because the tensile strength (durable force) of the fiber strand itself is lowered.

Notwithstanding such circumstances, triaxial fabrics of reduced weight woven from high elastic modulus carbon fiber strands are highly desired. Particularly in the aerospace industry, not only reduced weight but also other properties are sometimes required, such as a high rigidity, heat-dispersibility or thermal dimensional stability, for the purpose of obtaining composites of a mono-layered type or a multi-layered type used for a skin member (surface layer) of a honeycomb sandwich structure of an artificial satellite. To realize such properties, high elastic modulus carbon fibers having a high elastic-modulus, high thermal conductivity and low coefficient of thermal expansion are suitably used. Thornel p-758, P-100 and P-120 available from Amoco Performance Products are examples of such carbon fibers having high elastic modulus and high thermal conductivity.

It has long been desired to weave a triaxial fabric which is easily reduced in weight from the carbon fibers of the above properties and to use the same as a reinforcement substrate for a composite.

In this case, it is desired that the areal weight of the fabric (fabric weight per unit area) be 300 g/m$^2$ or less and the elastic modulus thereof be 3 tf/mm$^2$ or more in view of the balance between weight reduction and improvement of the elastic modulus. However, there are no triaxial fabrics having such properties in the prior art, because the weaving thereof is impossible, as stated above.

Thus, the production of triaxial fabrics improved in surface quality and those composed of carbon fibers having a high elastic modulus which have not been obtained in the prior art is a serious problem in this field.

DISCLOSURE OF THE INVENTION

An object of the present invention is to solve the above drawbacks in the prior art and to provide high quality triaxial fabrics composed of carbon fibers and a method for producing the same, which are suitable for a skin member of a honeycomb sandwich structure used in an artificial satellite or a solar cell panel.

That is, according to the present invention, a triaxial fabric is provided, wherein two sets of warp yarns (bias yarns) of carbon fiber strands are interwoven with one set of weft yarns (0° directional yarns) of carbon fiber strands having the same cross-sectional area as the bias yarn and arranged in the widthwise direction of the fabric, characterized in that the fabric has a crimp releasing ratio $(L'-L)/L$, after being subjected to a heat treatment at 1800° C. in an inert gas atmosphere, satisfying the following equation:

$$(L_0-L)/L_0 \times 0.7 \geq (L'-L)/L \geq 0$$

wherein L is an apparent length of the weft yarn composing the triaxial fabric; $L_0$ is a length of the waft yarn along the crimp; and L' is an apparent length of the weft yarn when removed from the fabric.

As shown in FIGS. 4(a) and 4(b), the crimp releasing ratio $(L'-L)/L$ defined herein represents a proportion of the length change of the weft yarn when the same is optionally pulled out from the fabric. In other words, it shows the extent to which the crimping degree $(L_0-L)/L$, of the fabric is released. If the crimp were completely fixed, the crimping degree would not change even after the yarn is been removed from the fabric and the crimp releasing ratio becomes zero. While, if the crimp is completely released, the crimp releasing ratio would be $(L_0-L)/L$.

The present invention further provides a method for producing a triaxial fabric characterized in that mesopitch-based carbon fiber strands having a tensile strength of 300 kgf/mm$^2$ or more, a tensile strain at break of 0.6% or more and a tensile elastic modulus of 15 tf/mm$^2$ or more are woven into a triaxial fabric, which then is subjected to a heat treatment in an inert gas atmosphere at a temperature of 1800° C. or more.

In addition, the present invention provides, as the use of the triaxial fabric described above, composites suitable for a single-layered or a multi-layered skin member of a honeycomb sandwich structure for an artificial satellite.

The present invention will be described in more detail below with reference to the attached drawings.

Fibers used in the present invention may be of any kind used in conventional triaxial fabrics, such as carbon fibers, aramid fibers or glass fibers. Of them, carbon fibers are particularly suitable for the present invention because of their high elastic modulus and small elongation at break.

Generally speaking, as shown in FIGS. 4(a) and 4(b), fiber strands in a fabric show bending, i.e., crimps. The degree of crimping is represented by the following equation (1) as the crimping degree.

$$(L_0-L)/L_0 \quad (1)$$

A triaxial fabric has a larger crimping degree than the conventional plain weave fabric due to its structure.

The fiber strand is forcibly bent in the fabric. Therefore, when fibers, especially carbon fibers having a high elastic modulus and small elongation at break, are used, the fiber portion in the crimp generates a force straightening the fiber, which results in a compression between the adjacent fiber strands intersecting each other. The higher the elastic modulus, the larger this force. Under the circumstances, if relative movement occurs in the fabric between the fiber strands intersecting each other by the handling thereof, etc., the fiber strands may be abraded in the intersecting portion, resulting in the damage or breakage of fibers. This is particularly significant if carbon fibers having a high elastic modulus are used.

To suppress the generation of fiber breakages, it is conceived to use fibers having a low elastic modulus or those having a large elongation at break. However, the use of fibers having a high elastic modulus is indispensable for obtaining articles having a reduced weight and high rigidity. In addition, generally speaking, since the elongation at break of carbon fibers decreases as the elastic modulus thereof increases, there are few fibers having large values of both elastic modulus and elongation at break.

As another means for suppressing the generation of fiber breakages, it is conceived to prepare the fabric with fiber strands inherently having original crimps therein to mitigate the compression between the fiber strands in the intersecting portion and to prevent fiber damage during abrasion.

However, there have been no methods in the prior art to produce a fiber strand inherently having crimps therein. Also it has been thought that, even though there were such methods, fiber strands inherently having crimps therein would be unsuitable for a reinforcement material because the fibers in the fiber strand would be oriented at a maximum angle $\theta$ to the reinforcement direction, which significantly reduces the tensile strength thereof.

According to the study made by the present inventors, it was found that, although the fiber strand pulled off from the fabric so that the crimps are maintained has a tensile strength and tensile modulus somewhat smaller than those of the original straight strand, there is no problem in the handling of the fabric itself and also there is almost no reduction in either tensile strength or tensile modulus of a resin matrix composite using the fabric as a reinforcement substrate.

It is surmised that this is because, since the fiber is completely coated with resin in the resin matrix fabric composite, stresses in the respective portions of the fiber are transmitted via the resin, and not locally concentrated at a certain point.

In this case, it is unnecessary to completely fix the crimps so that the crimp releasing ratio is zero, but at least 30% of the fabric crimping degree must be maintained. If the crimp releasing ratio is smaller than 30% of the fabric crimping degree (in other words, if the crimp releasing ratio is larger than $(L_0-L)/L_0 \times 0.7$), the compression between the fiber strands in the intersecting portion becomes larger, unfavorably increasing the abrasive force.

In this regard, the value of $(L_0-L)/L_0$ can be obtained by measuring the linear distance L between two optional points in the fiber strand by an optical-microscopic photograph or the like and a length $L_0$ thereof along the crimps by an image processor, a Curvimeter or others.

Values of the areal weight and the elastic modulus of the fabric may be optionally selected. However, the areal weight of the triaxial fabric is preferably in a range between 45 g/m$^2$ and 300 g/m$^2$, more preferably between 45 g/m$^2$ and 180 g/m$^2$, and the tensile modulus of a resin matrix composite wherein the triaxial fabric is impregnated with a resin is preferably 3 tf/mm$^2$ or more, more preferably 4.5 tf/mm$^2$ or more. That is, when the composite is used for an artificial satellite, the areal weight of the fabric-(fabric weight per unit area) is preferably less than 180 g/m$^2$ to obtain both weight reduction and a favorable elastic modulus, but it is difficult to produce a fabric having a basis weight of less than 45 g/m$^2$. From the viewpoint of obtaining both weight reduction and a favorable elastic modulus, the tensile elastic modulus of the resin matrix composite wherein the triaxial fabric is impregnated with a resin is 3 tf/mm$^2$ or more, preferably 4.5 tf/mm$^2$ or more. The triaxial fabric having such characteristics has not been known in the prior art.

This triaxial fabric is produced in the following manner. Carbon fiber strands are originated from a mesophase pitch to have a tensile strength of 300 kgf/mm$^2$ or more, a tensile strain at break of 0.6% or more and a tensile modulus of 15 tf/mm$^2$ or more, and woven into a greige triaxial fabric. Thereafter, the greige fabric is subjected to a heat treatment in an inert gas atmosphere at a temperature of 1800° C. or more. This heat treatment temperature of 1800° C. or more is selected based on the relationship between the temperature and the crimp releasing ratio shown in the graph of FIG. 5.

The carbon fiber composing the triaxial fabric is obtained from a pitch, preferably a mesophase.

By using the mesophase pitch, crimps in the fiber strand can be well fixed by heat treatment at a temperature of 1800° C. or more. Further, the carbon fiber prepared from the mesophase pitch is suitable for an artificial satellite material, because the properties thereof, such as a thermal conductivity, coefficient of thermal expansion, tensile modulus or others are superior to those of other carbon fibers. Pitches used as a starting material for the mesophase pitch include various kinds, such as coal pitch, liquidized coal pitch, ethylene tar pitch, petroleum pitch such as decant oil pitch obtained from a decomposition residue of fluid catalytic cracking, or synthetic pitch made of naphthalene or the like by using a catalyst. These pitches are treated in the conventional manner to be in a mesophase so that the optically anisotropic pitch appears therein.

The carbon fiber has a tensile strength of 300 kgf/mm$^2$, a tensile strain at break of 0.6% or more and a tensile modulus of 15 tf/mm$^2$ or more.

Even though there may be cases wherein the triaxial fabric can be woven from carbon fiber strands having a tensile modulus of less than 15 tf/mm$^2$, such a fabric is unfavorable because the weave structure may be slackened to generate gaps in the intersecting portions between the fiber strands due to the significant volume loss in the fiber strand after the graphitization.

Generally speaking, it is unnecessary to define an upper limit of the tensile modulus. However, since the tensile elongation at break becomes smaller as tensile modulus becomes higher, weaving of the triaxial fabric while using the fiber strands having an excessively high elastic modulus becomes difficult. Accordingly, the fiber strands having a tensile modulus, for example, of 40 tf/mm$^2$ or less are suitably used for this purpose. Nevertheless, carbon fiber strands having a tensile modulus higher than the above limit may be used if the weaving operation is possible.

When carbon fiber strands having a tensile modulus of 15 tf/mm$^2$ are used for weaving the triaxial fabric, the tensile strength thereof must be 300 kgf/mm$^2$ or more and the tensile strain at break must be 0.6% or more. If the tensile strength is less than 300 kgf/mm$^2$, the fiber strand may not be resistant to weaving tension, and if the tensile strain at break is less than 0.6%, fibers in the fiber strand are liable to be bent and broken during the weaving process, thereby the production of the triaxial fabric becomes difficult.

Such carbon fibers suitable for the present invention can be produced by a conventional method, including a spinning process, an infusion treatment, carbonization and/or graphitization.

The carbon fiber strands are woven into a triaxial fabric by a triaxial fabric loom. The weave structure, weaving density, linear density of the carbon fiber strand or others may be optionally selected. However, the triaxial fabric is usually woven into a basic structure at a weaving density of 9.25 end/inch.

To achieve a basic weight in a final product of 300 g/m$^2$ or less, preferably 180 g/m$^2$ or less for the purpose of weight reduction, it is necessary that the linear density of the fiber strand (defined by a weight per unit length or the fiber strand) be 300 g/km or less, preferably 180 g/km or less, when the carbon fiber strands (having a density of about 2.1) made of a mesophase pitch are woven into the triaxial fabric of the basic structure at the weaving density of 9.25 end/inch. However, if the linear density of the carbon fiber strand is less than 40 g/km, the weaving operation becomes difficult because the fiber strand is not resistant to a force applied thereon during the weaving operation. Accordingly, the linear density of the fiber stand is preferably in a range between 40 g/km and 300 g/km, more preferably between 40 g/km and 160 g/km.

The triaxial fabric thus woven is subjected to a heat treatment in an inert gas atmosphere at a temperature of 1800° C. or more. This heat treatment may be of a batch type wherein the triaxial fabric is preliminarily cut into pieces of a size suitable for being loaded into a furnace and processed therein in an inert gas atmosphere, or of a continuous type wherein the triaxial fabric is continuously supplied into a heat zone filled with an inert gas. The inert gas is, for example, $N_2$, Ar or others which are chemically inactive.

The inert gas atmosphere is used for preventing depletion by oxidation of the carbon fibers during the heat treatment. Therefore, the inclusion of a small amount of oxidative gas may be allowed as far as no depletion occurs. For example, there are cases wherein a carbon dioxide gas atmosphere exhibiting a weak acidic property can be used, provided the heat treatment is carried out for a short time.

The furnace may be of any type, provided it is possible to heat the fabric of a predetermined size at a predetermined temperature.

It is possible to fix the crimp in the fabric in the inert gas atmosphere at 1800° C. or more as stated above. When carbon fibers having a tensile modulus of 15 tf/mm$^2$ are used, the heat treatment must be carried out at 1800° C. or more for crimp fixation. A certain relationship is observed between the ease of crimp fixation and the growth of graphite crystal (see FIG. 5). That is, carbon fibers wherein graphite crystal growth is high (i.e., having a higher elastic modulus) need to be heat treated at a higher temperature. However, the duration of the heat treatment also influences the crimp fixation, and therefore, there are cases wherein a long heat treatment at a low temperature is equivalent in effect to a short heat treatment at a high temperature.

Accordingly, in such cases a heating profile can be experimentally determined in view of the crystal conditions of graphite in the carbon fiber strand used for weaving the fabric and the desired crystal conditions in the final fabric. For example, it is possible to heat the fabric at a temperature lower than that for the graphitization during the production of the carbon fiber strand used for weaving the fabric. In this regard, since graphite crystals are liable to grow as a result of the heat treatment, the elastic modulus of the fabric may become higher, but never lower.

As stated above, according to the present invention, it is possible to produce triaxial fabrics having a high tensile modulus that could not be attained by conventional methods, by adopting a heating profile capable of promoting graphite crystal growth in the fabric. For example, triaxial fabrics having both reduced weight and high elastic modulus can be produced, which was not shown in the prior art, and having a basis weight in the range between 45 g/m$^2$ and 300 g/m$^2$, preferably between 45 g/m$^2$ and 180 g/m$^2$, and a tensile modulus of 3 tf/mm$^2$ or more, preferably 4.5 tf/mm$^2$ or more. This is achievable by weaving a triaxial fabric of basic structure at a weaving density of 9.25 end/inch with carbon fiber strands having a tensile modulus of 15 tf/mm$^2$ or more and a linear density in a range between 40 g/km and 300 g/km, preferably between 40 g/km and 160 g/km, which fabric is then subjected to a heat treatment in accordance with a predetermined heating profile in an inert gas atmosphere. The heating profile used therefor is experimentally determined as stated before.

The resultant triaxial fabric has no slackness in the fabric structure caused by the volume reduction of carbon fiber strands during the heat treatment, and crimps in the fiber strands constituting the fabric are fixed. Therefore, the fabric has a good shape-retaining property and a favorable handling property, causing less fiber breakages during the handling thereof.

The tensile modulus of the triaxial fabric used in this text is obtained by a tensile test carried out while using, as a test piece, a resin matrix composite prepared by impregnating the triaxial fabric with resin. In the preparation of the triaxial fabric composite, 100 parts of epoxy resin (Epikote 828; produced by Yuka-Shell Epoxy K.K.) mixed with 3 parts of a hardening agent (Monoethylamine boron trifluoride complex) is dissolved in 150 parts of a solvent (methyl ethyl ketone) (all parts are by weight), which is then impregnated in the triaxial fabric. The fabric thus impregnated with resin is dried by air for 8 hours or more to have a fiber content of about 60% by volume, and thereafter cured in an autoclave at 120° C. for 2 hours under a pressure of 5 atmospheres to result in the target composite. Test places are prepared by cutting the composite into pieces having a size of 400 mm long×35 mm wide so that the stretching direction coincides with the longitudinal direction of one of the fiber strands.

A configuration of the test piece is shown in FIG. 6. The dimensions thereof are as follows:

Length of test piece (L): 400 mm

Width of test piece (B): 35 mm±2 mm

Thickness of test piece (C): the same as the thickness of triaxial fabric resin matrix composite after being cured.

Length of gauge (D): 300 mm

Thickness of tab (F): 1 mm

Length of tab (G): 50 mm

An adhesive is coated on the back surface of a strain gauge described below, and the test piece of composite is directly adhered thereon.

Strain gauge: PC-20-11-1L (biaxial type), manufactured by Kyowa Dengyo K.K.

Size of substrate: 30 mm×30 mm

Length of gauge: 20 mm

Electric resistance: 120±4Ω

The test piece is conditioned in accordance with Procedure A defined in ASTM D618 before the tensile test.

The tensile test is carried out by a universal tester at a strain speed in a range between 0.01 mm/mm min and 0.02 mm/mm min.

The thickness and width are measured at five points of the gauge section of the test piece including a center thereof, and data thus obtained are simply averaged to determine mean values, respectively.

The elastic modulus (E) is calculated by the following equation.

$$E=(\Delta P/A)/\Delta e$$

wherein ΔP is an increment of load between 10% and 30% of the maximum load at break, A is a cross-sectional area of the test pieces, and Δe is an increment of strain between 10% and 30% of the maximum load at break.

BRIEF DESCRIPTION OF THE DRAWINGS

FIG. 4(a) and (b) are a conceptual illustrations explaining the crimp releasing ratio, wherein FIG. 4(a) shows a crimp configuration of a weft yarn woven into a triaxial fabric and FIG. 4(b) shows a crimp configuration of a weft yarn released from the bend due to two sets of warp yarns in the fabric;

BEST MODE FOR CARRYING OUT THE INVENTION

Figure 1:
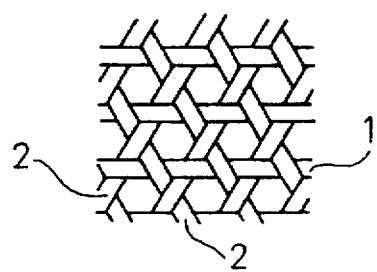
FIG. 1 is a schematic illustration of a triaxial fabric.
Figure 2:
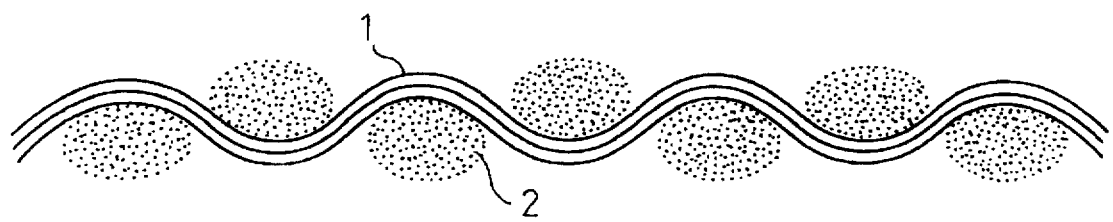
FIG. 2 is a conceptual illustration of a cross-section of the triaxial fabric.
Figure 3:
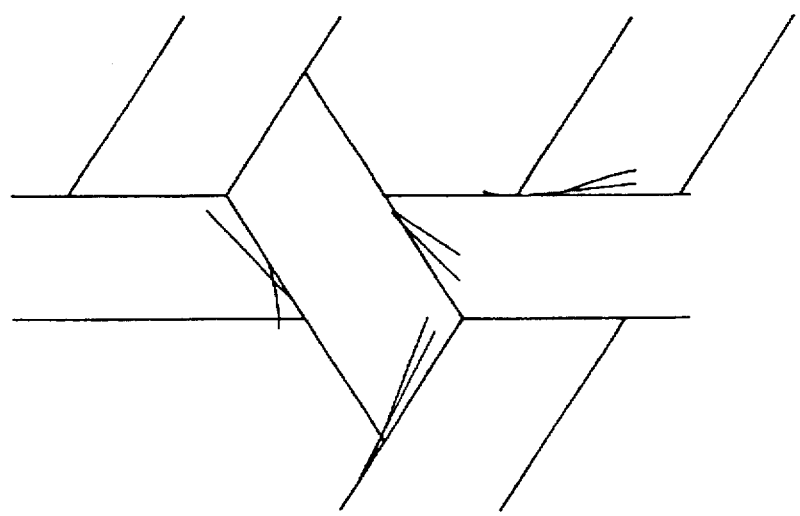
FIG. 3 is a schematic illustration of fiber breakages.
Figure 4A:
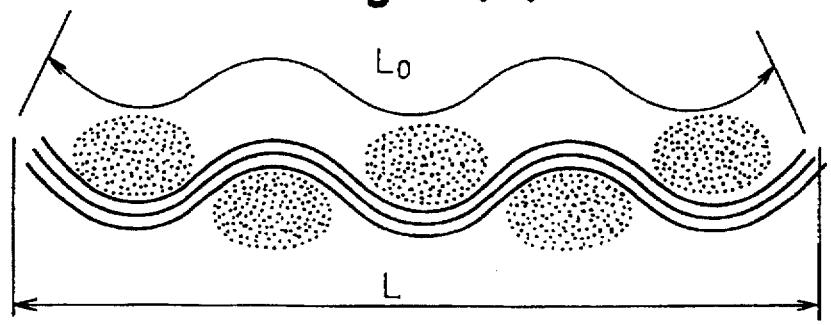
Figure 4B:
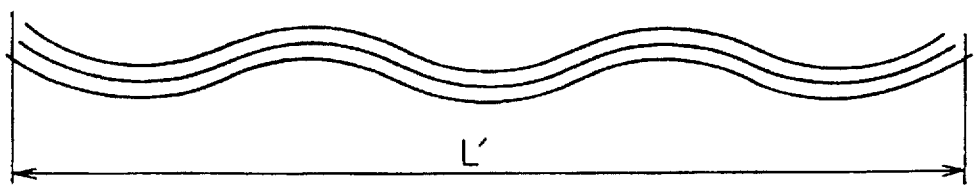
Figure 5:
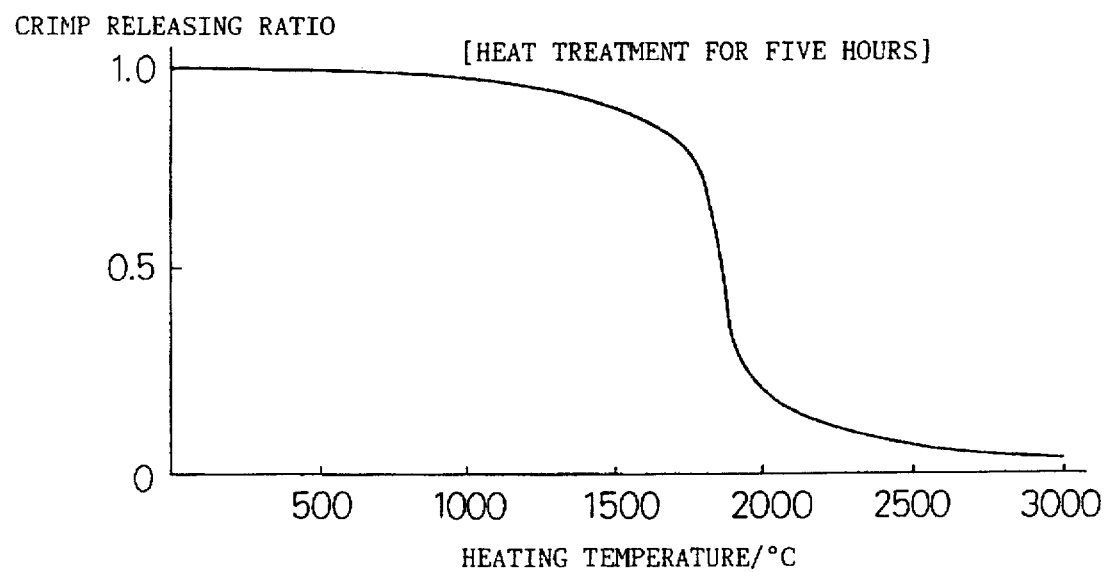
FIG. 5 shows the relationship between a heat treatment temperature and a crimp releasing ratio in the triaxial fabric.

The present invention will be described with reference to the preferred embodiments.

Preferred Embodiments

EXAMPLE 1

As one example of the present invention, a high elastic modulus triaxial fabric was prepared in the following manner. The triaxial fabric was woven from carbon fiber strands with a linear density of 95 g/km by a triaxial fabric loom (manufactured by Barber Colman Inc.), which strands originated from a mesophase pitch and had a tensile strength of 300 kg/mm$^2$, a tensile modulus of 35 tf/mm$^2$ and a tensile elongation at break of 0.92%. According to the observation of the appearance thereof, the resultant fabric had no fiber breakages and was very flexible. The greige fabric thus obtained was then cut into pieces, each having a size of 500 mm×500 mm, which pieces were then subjected to a graphitization treatment in a graphitization furnace in a N$_2$ and Ar gas atmosphere under the conditions of 2000° C.×5 hours, 2500° C.×10 hours and 2900° C.×4 hours, respectively. The graphitized pieces of the triaxial fabric were free from fiber loss due to the heat treatment and had a good appearance. In addition, no significant fiber breakages occurred during the handling thereof.

As a comparative example, the greige triaxial fabric was subjected to a graphitization treatment at 1500° C. for 5 hours. The resultant triaxial fabric had a good appearance but fiber breakages sometimes occurred during handling.

Then, to obtain the elastic modulus of the triaxial fabric thus produced, the fabric was processed to be a triaxial fabric resin composite, on which was carried out a tensile test.

Various physical properties of the triaxial fabric and the reinforced plastic composite thereof are shown below in Table 1.

TABLE 1

| | Fabric | | | Composite | |
|---|---|---|---|---|---|
| Heat Treatment Conditions | Crimp rel. ratio | Basis wt. (g/m) | Fiber breakage | Vf (%) | Tensile modulus (tf/mm$^2$) |
| 2000° C. × 5 hours | $(L_0 - L)L_0 \times$ 0.2 | 107 | very slight | 61 | 4.6 |
| 2500° C. × 10 hours | $(L_0 - L)L_0 \times$ 00.5 | 99 | slight | 58 | 7.6 |
| 2900° C. × 4 hours | $(L_0 - L)L_0 \times$ 00.3 | 98 | slight | 60 | 8.5 |
| 1500° C. × 5 hours (Comparative Ex.) | $(L_0 - L)L_0 \times$ 0.9 | 107 | present | 60 | 2.8 |

EXAMPLE 2

As another example of the present invention, a high elastic modulus triaxial fabric was prepared in the following manner. The triaxial fabric was woven from carbon fiber strands by a triaxial fabric loom, which strands originated from mesophase pitch and have a tensile strength of 300 kg/mm$^2$, a tensile modulus of 30 tf/mm$^2$ and a tensile elongation at break of about 1%. In this connection, the carbon fiber strand was composed of 3000 carbon fibers, each having a 7 μm diameter, for a total linear density of 270 g/km, and the triaxial fabric was of a basic structure having a weaving density of 9.25 end/inch.

The resulting greige fabric had a good appearance having no fiber breakages and was flexible. Thereafter, the greige fabric was cut into pieces, each having a size of 500 mm×500 mm, which pieces were then subjected to graphitization treatment in a graphitization furnace in an N$_2$ and Ar gas atmosphere under the conditions of 2000° C.×5 hours, 2500°×10 hours and 2900°×4 hours, respectively. The graphitized places of the triaxial fabric were free from fiber loss due to heat treatment, and had a good appearance. In addition, no significant fiber breakages occurred during the handling thereof.

As a comparative example, the greige triaxial fabric was subjected to a graphitization treatment at 1500° C. for 5 hours. The resultant triaxial fabric had a good appearance but fiber breakages sometimes occurred during handling.

Also as another comparative example, a trial was made for weaving a triaxial fabric from carbon fiber strands composed of 3000 carbon fibers, each having a 7 μm diameter, originated from a mesophase pitch, having a tensile strength of 350 kg/mm$^2$, a tensile modulus of 80 tf/mm$^2$ and a tensile elongation at break of 0.4%. However, the weaving operation was impossible because many yarn breakages occurred in the weaving process. Then, the weaving was manually carried out while using a simple jig to obtain a small fabric sample of a size of 30 mm×30 mm, which had many fiber breakages therein, and which had a deteriorated appearance.

Figure 6:
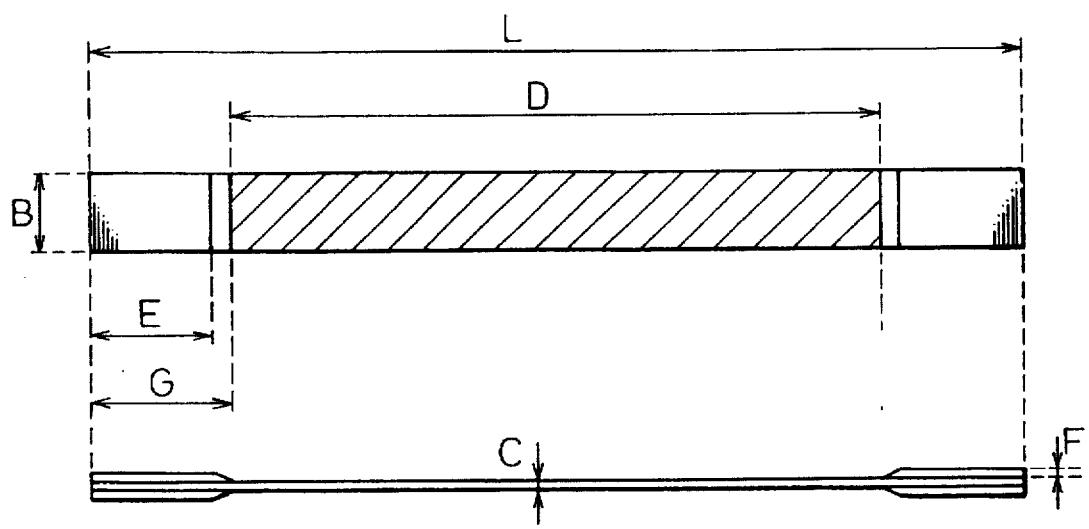
FIG. 6 is a plan view of a test piece used for the measurement of the elastic modulus of the triaxial fabric.

Then, to obtain the elastic modulus of the triaxial fabric thus produced, the fabric was processed into a triaxial fabric resin composite, on which a tensile test was carried out. That is, 100 parts epoxy resin (Epikote 828; produced by Yuka-Shell Epoxy K.K.) mixed with a 3 parts of hardening agent trifluoro monoethylamine boron trifluoride complex) was dissolved in 150 parts of a solvent (methyl ethyl ketone) (all parts are by weight), which is then impregnated in the triaxial fabric. The fabric thus impregnated with resin was dried by air for 8 hours or more to have a fiber content of about 60% by volume, and thereafter cured in an autoclave at 120° C. for 2 hours under 5 atmospheres to result in the target composite. Test pieces were prepared by cutting the composite into a size of 400 mm long×35 mm wide so that the stretching direction coincides with the orientation of weft yarns, and adhering a strain gauge (PC-20-11-1L (biaxial type), produced by Kyowa Dengyo K.K.) on one surface of the test piece. The tensile test was carried out after tabs were attached to the test piece as shown in FIG. 6. The tensile modulus was obtained from a stress-strain curve depicted through the strain gauge as an inclination between two points on the curve corresponding to 10% and 30% of the strain at break. The cross-sectional area of the test piece was calculated from the width and thickness of the test piece.

Various physical properties of the triaxial fabric and the reinforced plastic composite thereof are shown below in Table 2.

TABLE 2

| Heat Treatment Conditions | Fabric | | | Composite | |
|---|---|---|---|---|---|
| | Crimp rel. ratio | Basis wt. (g/m) | Fiber breakage | Vf (%) | Tensile modulus (tf/mm$^2$) |
| 2000° C. × 5 hours | $(L_0 - L)L_0 \times 0.25$ | 207 | slight | 61 | 4.0 |
| 2500° C. × 10 hours | $(L_0 - L)L_0 \times 0.1$ | 265 | slight | 62 | 6.8 |
| 2900° C. × 4 hours | $(L_0 - L)L_0 \times 0.1$ | 260 | slight | 60 | 7.5 |
| 1500° C. × 5 hours (Comparative Ex.) | $(L_0 - L)L_0 \times 0.9$ | 207 | present | 58 | 2.8 |

Next, a honeycomb sandwich panel was prepared, as a mock solar cell panel. A triaxial fabric was woven from carbon fiber strands by a triaxial fabric loom, which strands are originated from a mesophase pitch and have a tensile strength of 300 kg/mm$^2$, a tensile modulus of 30 tf/mm$^2$ and a tensile elongation at break of about 1%. In this connection, the carbon fiber strand was composed of 1000 carbon fibers, each having a 7 μm diameter for a total linear density of 95 g/km, and the triaxial fabric was of a basic structure having a weaving density of 9.25 end/inch. The greige fabric was cut into pieces, each having a size of 500 mm×300 mm, which pieces were then subjected to graphitization treatment in a graphitization furnace in an N$_2$ and Ar gas atmosphere at 2500° C. for 10 hours. The resultant fabric had a basis areal weight of 95 g/m$^2$. The triaxial fabric was impregnated with a hot-melt type epoxy resin (R521 produced by Shin-Nittetsu Kagaku K.K.) and cured in an autoclave at 120° C. for 2 hours under a pressure of 5 atm to produce a reinforced plastic composite. A sandwich panel was prepared using the resultant composite as a skin member and an aluminum honeycomb (produced by Al CORE, ½ inch thickness, ⅛ inch cell size and 0.0007 inch foil thickness) as a core member, both being adhered to each other via a film adhesive Redux 312 UL (produced by CIBA GEIGY) by hot pressing.

As a comparative example, a composite was prepared in the following manner. A unidirectional prepreg (T300 produced by Toray Industries, having a tensile modulus of 23 tf/mm$^2$ and a areal weight 50 g/m$^2$) was cut into pieces sized 500 mm×300 mm, so that three pairs were obtained, oriented in the 0°, +60° and −60° directions, respectively. The six pieces were layered with each other in such a manner that they were symmetrically arranged as seen in the normal direction; 0/+60/−60/−60/+60/0, and cured in an autoclave at 120° C. for 2 hours under a pressure of 5 atms to prepare the target composite. There were problems in this case that the cutting of the prepreg was troublesome and there was much loss in the cutting operation. A sandwich panel was prepared from the resultant composite in the same manner as in the above example. The weights of the panel and rates of thermal conduction of the skin member are shown in Table 3. It is apparent that the panel according to the present invention has a reduced weight and a high thermal conductivity, and is suitable for a solar cell panel. The rate of thermal conduction used in this text is the amount of heat flowing through a material 1 m long per unit time with a temperature gradient of 1° k/m, which is represented by multiplying the thermal conductivity by the thickness of the material.

TABLE 3

|  | Panel weight | Rate of thermal conduction |
|---|---|---|
| Example | 860 g/m² | 40 × 10⁴ |
| Comparative Example | 1500 g/m² | 3 × 10⁴ |

INDUSTRIAL APPLICABILITY

A triaxial fabric having a reduced weight and a high tensile modulus is provided according to the present invention. The fabric of the present invention is excellent in the shape retaining ability, whereby the fiber breakage is greatly minimized in the intersecting portion between fiber strands during the handling thereof. Further, the fabric according to the present invention is useful as a reinforcement substrate for a composite requiring a reduced weight. Particularly the fabric is most suitable for satellite antennas and skin members of solar cell panels.

We claim:

1. A triaxial fabric wherein two sets of warp yarns (bias yarns) of carbon fiber strands are interwoven with one set of weft yarns (0° directional yarns) of carbon fiber strands having the same cross-sectional area as the bias yarn and arranged in the widthwise direction of the fabric, characterized in that the fabric has a crimp releasing ratio (L'−L)/L, after being subjected to a heat treatment at 1800° C. in an inert gas atmosphere, satisfying the following equation:

$$(L_0-L)/L_0 \times 0.07 \geq (L'-L)/L \geq 0$$

wherein L is a apparent length of the weft yarn composing the triaxial fabric; $L_0$ is a length of the weft yarn along the crimp; and L' is an apparent length of the weft yarn when removed from the fabric.

2. A triaxial fabric as defined by claim 1, characterized in that the triaxial fabric is composed solely of carbon fiber strands originated from a mesophase pitch.

3. A triaxial fabric as defined by claim 1, characterized in that the triaxial fabric is of a basic structure.

4. A triaxial fabric as defined by any one of claims 1 through 3, characterized in that the areal weight (fabric weight per unit area) of the triaxial fabric is in a range between 45 g/m² and 300 g/m² and the tensile elastic modulus of a triaxial fabric composite prepared by impregnating the fabric with a resin is 3 tf/mm² or more.

5. Single-layered and multi-layered composites such as a honeycomb sandwich structure for an artificial satellite or the like formed of the triaxial fabric as defined by any one of claims 1 through 4.

6. A method for producing a triaxial fabric characterized in that carbon fiber strands having a tensile strength of 300 kgf/mm² or more, a tensile strain at break of 0.6% or more and a tensile modulus of 15 tf/mm² or more are woven into a triaxial fabric, which then is subjected to a heat treatment in an inert gas atmosphere at a temperature of 1800° C. or more.

7. A method for producing a triaxial fabric as defined by claim 6, characterized in that carbon fibers originated from a mesophase pitch are used as a starting material.

8. A method for producing a triaxial fabric as defined by claim 7, characterized in that the linear density (fiber weight in a unit length) of the fiber strand composing the triaxial fabric is in a range between 40 g/km and 300 g/km.

* * * * *